No. 862,915. PATENTED AUG. 13, 1907.
E. J. HOFFMAN.
GRATE.
APPLICATION FILED APR. 10, 1906.
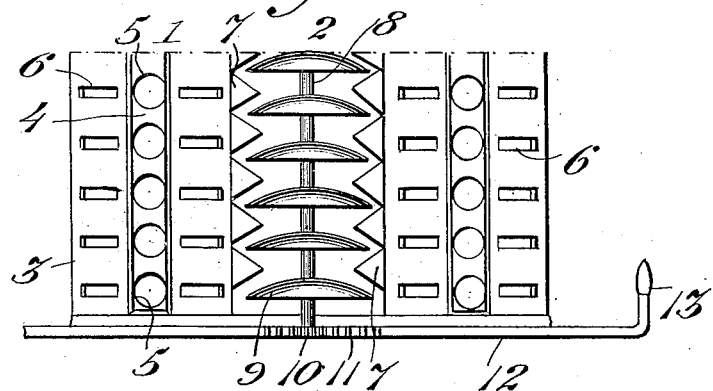
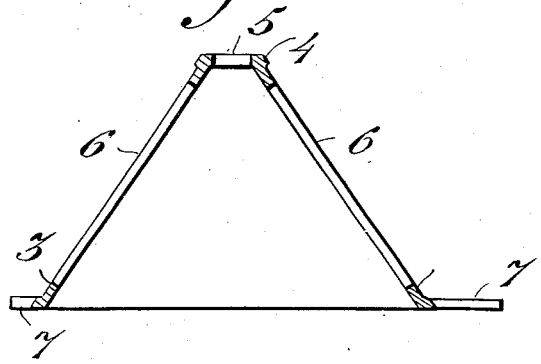
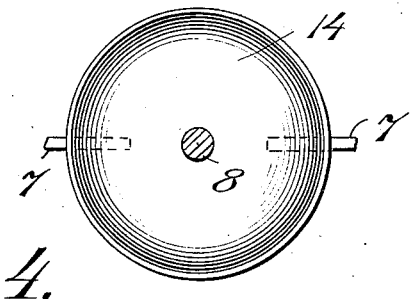
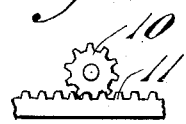
Witnesses
Phil. E. Barnes
D. W. Gould.
Inventor
E. J. Hoffman
By Victor J. Evans,
Attorney
THE NORRIS PETERS CO., WASHINGTON, D. C.

UNITED STATES PATENT OFFICE.

EDWARD J. HOFFMAN, OF JERSEY CITY, NEW JERSEY.

GRATE.

No. 862,915.

Specification of Letters Patent.

Patented Aug. 13, 1907.

Application filed April 10, 1906. Serial No. 310,970.

*To all whom it may concern:*

Be it known that I, EDWARD J. HOFFMAN, a citizen of the United States of America, residing at Jersey City, in the county of Hudson and State of New Jersey, have invented new and useful Improvements in Grates, of which the following is a specification.

The invention relates to an improvement in grates constructed and arranged primarily for increasing combustion and for the easy removal of ashes or other undesirable accumulations.

The main object of the present invention is the production of a grate made up of air feeding sections and shaker sections arranged in alternate order, the shaker sections being connected for simultaneous operation, the construction providing for an excess supply of oxygen to the fuel to practically consume the carbon in the products of combustion and to insure a uniformly clean fire bed.

The invention in its preferred details of construction will be fully described in the following specification, reference being had to the accompanying drawings, in which:—

Figure 1 is a plan showing the arrangement and cooperation of the grate sections of my improved grate. Fig. 2 is an enlarged vertical section through one of the air feeding sections of the grate. Fig. 3 is a view in elevation of one of the disks of the shaker section. Fig. 4 is a detail illustrating the operation of the shaker sections.

Referring to the drawings my improved grate is made up of air feeding sections 1 and shaker sections 2, said sections being arranged in alternate order transverse the length of the grate and extending longitudinally in approximately parallel relation throughout the length of the fire box, the ends of the sections being supported in the grate girders common in grate constructions. The aid feeding sections are of pyramidal form in cross section, comprising side plates 3 and a top plate 4, the latter being of relative narrow width, as shown.

The top plate is formed with a series of longitudinally arranged spaced openings 5, preferably of circular form and spaced apart a distance less than the diameter of the openings. The openings 5 are approximately equal in diameter to the width of the plate 4, forming in effect a series of transverse webs joining the side plates.

Each of the side plates are formed with a series of spaced slotted openings 6, extending transverse the length of the plate and arranged in alinement with the openings in the top plate. The slots 6 extend practically throughout the width of the side plates, providing in the air feeding section a series of openings through which the air may reach the coals supported on the section. The lower edges of each of the side plates 3 are formed with a series of lateral projections 7, which are preferably of triangular form to provide a series of fingers, the free ends of which are relatively spaced apart for a purpose to be hereinafter described.

The shaker section is arranged between two of the air feeding sections, and comprises a shaft 8 revolubly supported in the grate girders. The shaking disks 9, which are preferably concavo-convex in section are secured to the shaft 8 at equidistant points throughout the length of the latter. The disks are arranged between adjacent fingers projecting from the air feeding sections, and are of sufficient diameter to insure that their peripheral edges will project inward beyond the free ends of said fingers, that is, toward the air feeding sections. It is to be understood that one disk is provided for each space between the adjacent fingers, so that said disks effectively close such spaces against the free passage of the unconsumed fuel. The space between the respective disks of the shaker section is also arranged to prevent the free passage of the unconsumed fuel between said disks, so that the shaker section provides an effective support for the fuel in the space between the adjacent air feeding sections. The shaft 8 of the shaker section projects forwardly beyond the grate girder and is provided with a gear 10 designed to mesh with a toothed section 11 of an operating rod 12. The rod extends transverse the grate, being arranged, as will be understood, to engage all of the shaker section shafts, and is provided at one end with a suitable operating handle, as 13.

While preferring that the disks of the shaker section be of concavo-convex form, it is obvious that they may with equal effectiveness be of double convex form, as shown at 14 in Fig. 3.

The respective air feeding and shaker sections are arranged in alternate order transverse the grate structure, being designed to receive the fuel directly thereon. The openings in the air feeding sections provide for the supply of an excess amount of oxygen to the burning fuel to consume the gases and carbon particles in the products of combustion. Under obvious operation of the rod 12 the shafts 8 of the respective shaker sections may be simultaneously revolved with the effect to cause the disks to clear the fire bed by directing the ashes and other unconsumed products to the ash pit. The inclination of the sides of the air feeding sections directs the ashes and unconsumed particles of fuel to the fingers and on to the disks 9 from which such product is readily directed to the ash pit in the revolution of the disks.

The use of the air feeding sections will materially increase the efficiency of the fuel through the consumption of the carbon and unconsumed gases in the products of combustion, while the shaker sections provide for a ready and convenient cleaning of the fire bed in order to insure more perfect and regular combustion.

The grate may, of course, include as many of the respective sections as are warranted by the size of the fire box, and while the grate is primarily designed and thoroughly effective with steam generating fuel, it is apparent that it is as serviceable with other fuel, and that the respective sections may be increased or decreased in size relative to each other without materially changing the result incident to its use.

Having thus described the invention, what is claimed as new, is:—

1. A grate comprising a series of air feeding sections arranged in spaced parallel relation, fingers projecting from the edges of said sections, a shaft revolubly supported between the air feeding sections, and disks supported on said shaft and projecting between the fingers of the adjacent air feeding sections.

2. A grate comprising a series of air feeding sections arranged in spaced parallel relation, each of said sections being of pyramidal form in cross section, a series of fingers projecting laterally from and in alinement with the bases of the air feeding sections, and a series of disks mounted for revolution between the series of air feeding sections, said disks projecting between the fingers of the adjacent air feeding sections.

3. A grate comprising a series of air feeding sections arranged in spaced parallel relation, each of said sections being of pyramidal form in cross section, a series of fingers projecting laterally from and in alinement with the bases of the air feeding sections, and a series of disks mounted for revolution between the series of air feeding sections, said disks projecting between the fingers of the adjacent air feeding sections, the axes of the disks being in a plane with the fingers of the respective air feeding sections.

In testimony whereof, I affix my signature in presence of two witnesses.

EDWARD J. HOFFMAN.

Witnesses:
   JOHN H. VERE,
   AUGUST JUST.